United States Patent [19]

Blytas et al.

[11] 4,253,928
[45] Mar. 3, 1981

[54] PROCESS FOR SOUR WATER TREATMENT

[75] Inventors: George C. Blytas, Houston, Tex.;
Rudolf J. Maas, Amsterdam,
Netherlands; Andreas B. van Aken,
Amsterdam, Netherlands; **Christiaan
van Schalkwijk,** Amsterdam,
Netherlands

[73] Assignee: Shell Oil Company, Houston, Tex.

[21] Appl. No.: 81,708

[22] Filed: Oct. 4, 1979

[51] Int. Cl.³ ............................................. B01D 13/02
[52] U.S. Cl. ................................ 204/180 P; 204/130; 204/151
[58] Field of Search .................... 204/180 P, 301, 130, 204/151

[56] References Cited

U.S. PATENT DOCUMENTS

| | | | |
|---|---|---|---|
| 2,860,095 | 11/1958 | Katz et al. | 204/180 P |
| 3,752,749 | 8/1973 | Chlanda et al. | 204/180 P |
| 3,909,382 | 9/1975 | Mueller et al. | 204/180 P |
| 4,110,175 | 8/1978 | Ahlgren et al. | 204/180 P |

*Primary Examiner*—Arthur C. Prescott
*Attorney, Agent, or Firm*—Dean F. Vance

[57] ABSTRACT

A process for sour water treatment in which the sour components are removed from a sour water stream in an electrodialysis step in which the sour water stream becomes the dilute stream. A resulting concentrate stream, richer in the sour components than the original stream is then steam stripped. In order to balance the acid and basic components in the dilute stream the component lacking may be added to the stream. In order to prevent build-up of non-strippable components in the concentrate stream a part of the latter is recombined with the dilute stream either before or after the electrodialysis step.

8 Claims, 4 Drawing Figures

PROCESS FOR SOUR WATER TREATMENT

BACKGROUND OF THE INVENTION

1. Field of the Invention

This invention relates to a process and plant for treating water to remove volatile ionizable components, specifically a volatile acid and a volatile base. It is particularly suitable for treatment of sour water to remove ammonia, hydrogen sulfide and other contaminants.

2. The Prior Art

Conventionally sour water, particularly from refineries, is treated by stripping it with steam. Such a process is capable of producing treated water which meets the present waste water effluent regulations in most countries of the world. It is however expensive to operate because of the large quantity of steam required, particularly at lower concentrations of the contaminants. For instance, to achieve a 50% reduction in the volatile components, very nearly the same quantity of steam will be required whether the initial concentration is in the order of 20,000 ppm or 200 ppm. The effective efficiency, of such steam stripping is thus at its highest at higher concentrations of the volatile components in terms of the quantity of the volatile components removed per kilogram of steam. What is needed is a process for reducing the concentration of volatile components in an aqueous solution to a very low level in a way that is more efficient in its use of energy.

SUMMARY OF THE INVENTION

The present invention broadly encompasses a process for treating a stream to remove a volatile acidic component and a volatile basic component. Specifically, the claimed process comprises subjecting a sour water stream to an electrodialysis step in which the acidic component and the basic component migrate from the stream through fixed anion and cation exchange membranes respectively to one or more concentrate streams, and steam stripping the concentrate stream(s) in order to remove the volatile acidic component and the volatile basic component.

The process is particularly suitable for treating refinery sour water containing $H_2S$ and $NH_3$. In aqueous solution the larger fraction of the sulfur in the sulfide is in the monovalent HS or undissociated $H_2S$ form, very little $S^{--}$ being present. In the case where there is an excess of $NH_3$ over $H_2S$ a significant proportion of the ammonia will be in the undissociated form. In addition, sour water often contains other ionic species, for example, phenolates, formates, cyanates, carbonates and the like. It may also contain some metal ions such as iron, cobalt and vanadium in small amounts. Unlike a NaCl solution, for example, sour water is not necessarily a good electrolite and behaves very differently. Not only are the equilibria of the various reactions substantially different, but also the molar ratio of $NH_4^+$ cations to the $HS^-$ anions is not necessarily 1 to 1. We have, however, found that it is possible to concentrate such sour water streams by electrodialysis even at quite low concentrations, so that the resulting dilute stream may have a very low final $H_2$ and $NH_3$ content.

In general the efficiency of the electrodialysis step is high in terms of electrical power utilization. Its efficient use of energy stems from the fact that it is virtually only the ions which pass through a membrane to a concentrate stream which use up electric current. Allthough the greatest efficiency may be achieved at low current densities, the process is less effective under these conditions, and a very large membrane surface area will be necessary, so that it is generally preferred to sacrifice some efficiency for more effective use of the membranes. Furthermore, in order to obtain a more effective use of the membranes and to increase the concentration in the concentrate stream there may be a number of electrodialysis stages each provided with a feedback loop through which some of the flow is recirculated.

The concentrate from the electrodialysis step is conveniently steam stripped from a high concentration—generally in excess of 12,000 ppm combined $NH_3$ and $H_2S$, to sufficiently low concentration that in the electrodialysis steps so called "back diffusion" (i.e., reverse flow across the membranes) of ionized components does not become significant. At high concentrations steam stripping is more attractive in energy terms, as a relatively small quantity of steam can effect a substantial reduction, in absolute terms, of the sour components in the concentrate stream.

Back diffusion may take place when the difference in the concentration between the concentrate and dilute streams becomes large. In order to reduce its occurrance as much as possible, the concentrate stream flows in counter current with the dilute stream (i.e., the one to be treated). Where it is desired that the treated stream shall be very pure, it may be advantageous to use purer water for the concentrate stream in the last stage or stages of the electrodialysis step. In this way, the treated stream may even be sufficiently pure to be used to provide boiler feed water.

In the electrodialysis step it is preferable that a balance be maintained between the acidic and basic components. This can be maintained by adding back to the dilute stream the component in which it is deficient—normally the acid component. This may either be done at the beginning or at an intermediate stage or both. In spite of the fact that more sour components in total will have to be removed it can lead to lower end concentrations and to economies in capital cost and operation. In certain circumstances it may, however, be desirable to allow the dilute stream to become weakly basic in order to cause less easily ionizable components to be ionized and thus capable of being extracted by electrodialysis. Of particular importance in this respect are phenolates which are often present in sour water but are otherwise not readily removable.

In a particular embodiment of the invention the main portion of the stream to be treated comprises the dilute stream while the remainder of it is used as the concentrate stream, which stream is arranged to flow in counter current with the dilute stream. The concentrate stream is concentrated to a very high degree, usually in excess of 40,000 ppmw sour components and preferably up to 80,000 ppmw sour components. By so doing the volume of the concentrate stream may be kept very small, for example, at less than an eighth of the dilute stream. It may then be passed to a small, but specially adapted stream stripper made from alloys which are capable of resisting the corrosive nature of such a stream. Stripping such a concentrated stream to a level where it can be further treated by conventional means requires little steam per mole of sour components removed and results in high overall efficiency in addition to a very compact plant which may more than compensate for the more sophisticated materials required.

Part of the invention includes a plant for carrying out the above process. The plant comprises (a) one or more electrodialysis units each provided with a plurality of parallel passages formed by a series of alternate anodic and cathodic membranes disposed between an anode and a cathode arranged to be connected to a direct current source so that in the presence of an electrolyte, such as an aqueous solution of a volatile acid and a volatile base, alternate passages contain concentrate and dilute streams respectively, (b) means for passing the stream to be treated to the passages with a tendency to dilute the stream, (c) a stream stripping unit and (d) means for circulating the concentrate stream in the other passages of the electrodialysis unit to the steam stripping unit.

Although such a plant may not necessarily be less expensive to construct than a conventional steam stripping plant, for the same quality of effluent it will normally require a smaller energy input, and will probably be capable of meeting more stringent specifications as to the final quality of the effluent. It also has the advantage of offering an alternative process whereby the plant can be extended as energy becomes more expensive, in order to obtain a further saving in the energy consumption.

In an alternative embodiment, the sour water may be pretreated in a steam stripper prior to the process according to the invention. This may be advantageous where the sour water stream already contains a high concentration of sour components. More preferably, however, only the concentrate stream will be stripped.

Usually the dielectrodialysis unit will comprise several electrodialysis stages arranged in series. In addition, a part of the concentrate stream will usually be recirculated in feed back loops in order to obtain a higher concentration.

In another embodiment the electrodialysis unit may be combined with a small auxiliary steam stripper in parallel with it in order to improve the effluent from the plant and to prevent a build up of electrolysed nonvolatile salts which might otherwise accumulate in the concentrate circuit.

DETAILED DESCRIPTION OF THE INVENTION

Figure 1:
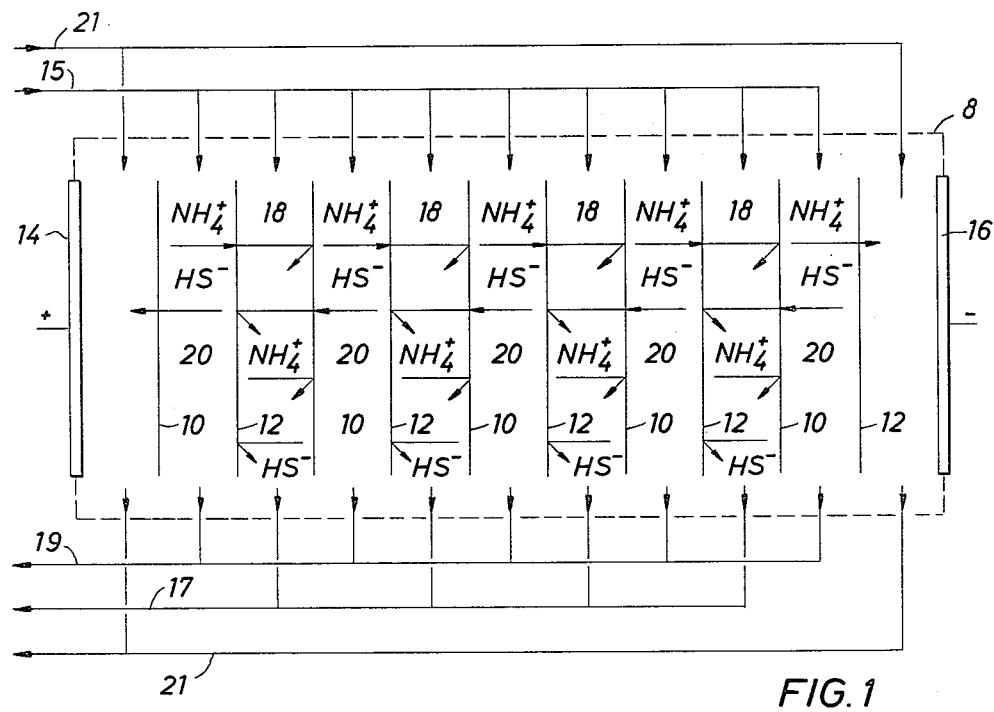
FIG. 1 is a diagram showing the principle of electrodialysis.

FIG. 1 illustrates schematically the basic principle of an electrodialysis unit 8. Basically it comprises a plurality of membranes, alternately anodic 10 and cathodic 12, placed between an anode 14 and a cathode 16 connected to a direct current supply. The membranes 10, 12 are usually separated from each other by 1 to 5 mm using appropriate spacers and the stream may be made to flow through a labyrinth in order to increase its contact with the membranes. The construction of the unit is generally in the form of pack, like a filter pack. The membranes which usually contain ion-exchange groups have a fixed positive or negative charge.

When a direct current is applied across the two electrodes 14 and 16, anions (here represented by $HS^-$) will tend to migrate towards the anode passing the anodic membranes 10 and being stopped by the first cathodic membrane 12.

If a stream 15 is introduced uniformly from the top of the unit 8 it will be found that the passages 18 having an anodic membrane on the cathodic side of the passage and vice versa will become concentrate streams 17 richer in ionized components and the other streams 19 in passages 20 bounded by anodic membranes on the anode side and cathodic membranes on the cathodic side will become depleted in ionized components. A separate stream 21 flows over the electrodes to prevent unwanted electrode reactions from taking place. A suitable solution comprises a 1 molar solution of acidified sodium sulfate ($Na_2SO_4$).

For optimum operation the cationic components should roughly be in the ratio of 1:1 with the anionic components. The susceptability to electrodialysis of different components may differ, for example, due to their different degrees of ionization. Indeed, unless a satisfactory balance can be maintained in the electrodialysis units, even to the extent of adding back some of the deficient component, which in practice is the one which is most mobile, the process may not be very effective.

The cation- and anion-transfer membranes can be any cation- and anion-selective membranes respectively, which are capable of withstanding the acidity and basicity of the sour water. Examples of suitable membranes are disclosed in U.S. Pat. No. 2,860,095 and the article entitled "Electrodialysis", Kirk-Othmer Encyclopedia of Science and Technology, pages 846–865 (2nd edition, Interscience Publishers 1965). Suitable membranes may be obtained from Ionics Incorporated 152 Sixth Street, Cambridge, Massachusetts. The cation membranes may for instance comprise an insoluble ion-exchange material of cross-linked sulfonated copolymers of vinyl compounds either in the form of a homogeneous sheet or cast on a matrix of synthetic reinforcing fabrics. Such a membrane is sold by the above company under the reference "TYPE CR61". The anion membrane may comprise an insoluble ion-exchange material of cross-linked copolymers of vinyl monomers containing quaternary ammonium anion exchange groups either in the form of a homogeneous sheet or cast on a matrix of synthetic reinforcing fabrics. Such a membrane is obtainable from the above company under the reference "TYPE AR103".

While in terms of electrical efficiency it would be preferred to carry out the process at above 50° C. and preferably up to 90° C., at the present time available membranes effectively limit the maximum operating temperature to about 70° C.

Figure 2:
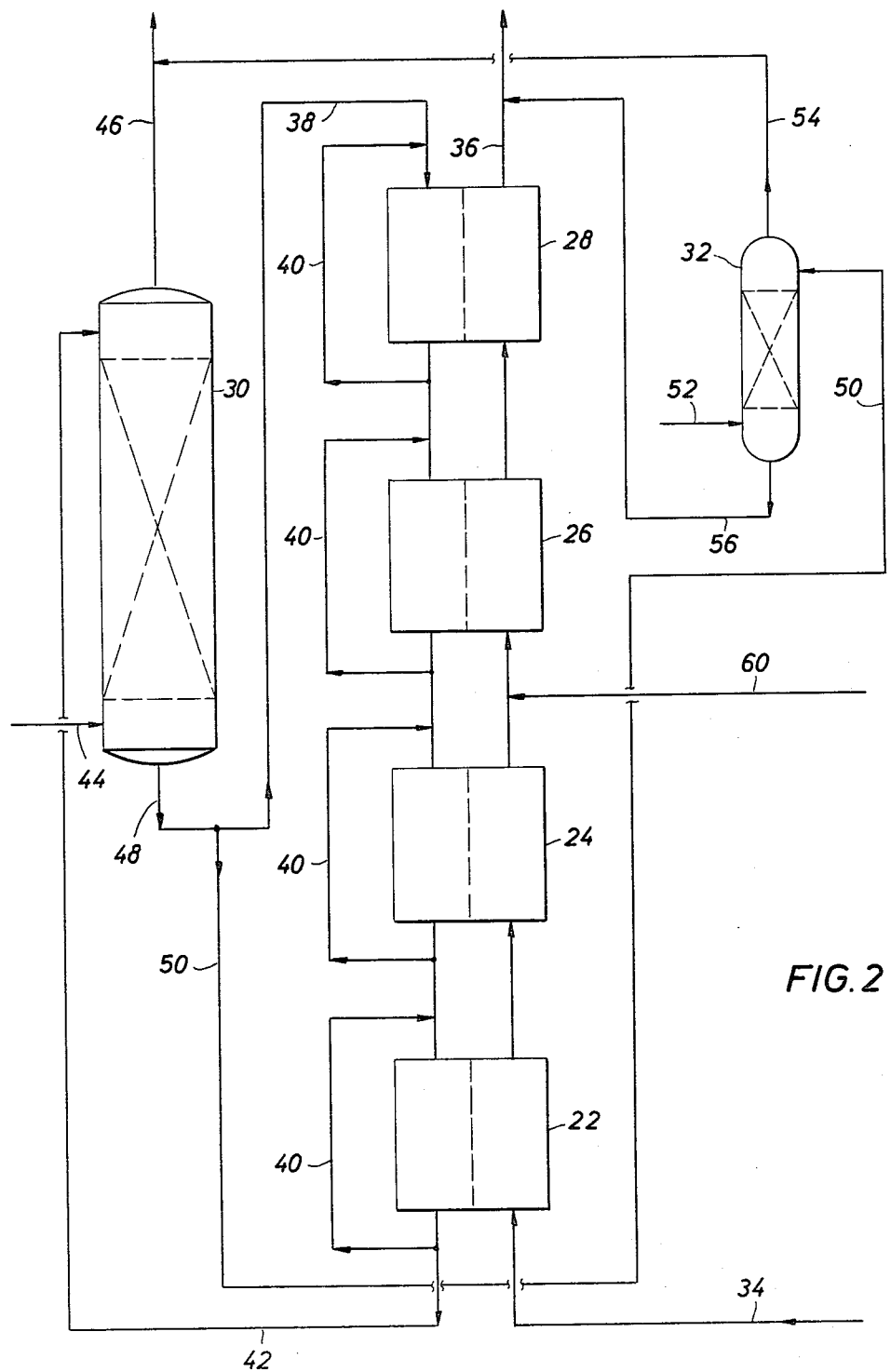
FIG. 2 is a schematic block diagram of a plant in accordance with the invention.

FIG. 2 shows a sour water treatment plant comprising an electrodialysis unit in four stages (22, 24, 26, 28), a main stripping vessel 30 and an auxiliary stripping vessel 32.

Sour water feed enters by line 34 and flows through the four electrodialysis units 22, 24, 26, 28 which are arranged in series. In each unit it may be held up by a tortuous path which the passage between the membrane takes due to a labyrinth formed in a spacing member which normally separates the membranes. Treated water which constitutes the dilute stream in the electrodialysis units leaves the unit 28 by line 36.

The concentrate stream enters the unit 28 by line 38 and flows through the electrodialysis units 28, 26, 24 and 22 in countercurrent to the dilute stream. (The membranes in the units, which in practice may contain a hundred or more membranes, are represented for convenience as a simple broken line separating the two streams.) Unlike the dilute stream, the concentrate stream is provided with feed-back loops 40 by which some of the flow is recirculated through the various units in order to increase its final concentration as it leaves the unit 22 by line 42 by which it passes to the upper end of the main stripping vessel 30. The concentrate stream descends the vessel 30—in this case shown as a packed column—in countercurrent with stripping steam which enters by line 44. Stripped gas leaves the vessel by its upper end by line 46. The stripped water leaves the vessel 30 by line 48/38 to be returned to the electrodialysis unit 28. A small bleed stream 50 is taken from the line 48 and passed through the auxiliary stripping vessel 32. As with the main vessel 30 steam enters by line 52 at the lower end of the vessel 30 and gas leaves by its upper end by line 54, joining line 46. Treated water is passed by line 56 to the outlet of the dilute stream in line 36.

In a typical example 100 m$^3$/h of sour water at 25° C. containing 2129 ppmw NH$_3$ and 3871 ppmw H$_2$S as the main sour components and 380 ppmw non-volatile salts enters an electrodialysis unit having an effective membrane area of 4500 m$^2$ by line 34. At an electric power consumption of approximately 17 Kwh/m$^3$ water leaving the unit by line 36 has 30 ppmw NH$_3$ and 20 ppmw H$_2$S and 2 ppmw non-volatile salts. In general the voltage across each pack of membranes is arranged wo that there is a voltage of 3 to 4 volts per cell pair. In practice this results in a current density of up to 300 amp/m$^2$ at the inlet and about 5 amp/m$^2$ at the outlet due to the poorer conductivity of the more dilute electrolyte.

When water from the auxiliary stripper 32 is added to the dilute stream 36 by line 56, the 105 m$^3$/h water leaving the plant contains 38 ppmw NH$_3$, 20 ppmw H$_2$S and 363 ppmw NaCl.

The concentrate stream entering the unit 28 by line 38 has 5000 ppmw NH$_3$ and 909 ppmw H$_2$S and 4254 ppmw non-volatile salts. On leaving the unit 22 the concentrate stream has 8800 ppmw NH$_3$ and 9311 ppmw H$_2$S and 4679 ppmw non volatile salts. Four m$^3$/h of low pressure steam is used in the main stripper.

In order to improve the effectiveness of the electrodialysis step a balancing stream of H$_2$S is added by line 60 to the dilute stream between the units 22 and 24. In this example 1135 mol/h H$_2$S was used to reestablish a satisfactory equilibrium.

It will be seen that the auxiliary stripper 32 is important in the example given in order to prevent a build up of non-volatile salts in the main stripper or in the concentrate circuit. Where no non-volatile salts are present, the auxiliary stripper circuit can be omitted.

In practice if the concentrate contains more than about 20,000 ppmw combined NH$_3$ and H$_2$S, special steels will be required for the concentrate circuit and for the main stripper due to corrosion which would otherwise take place.

Figure 3:
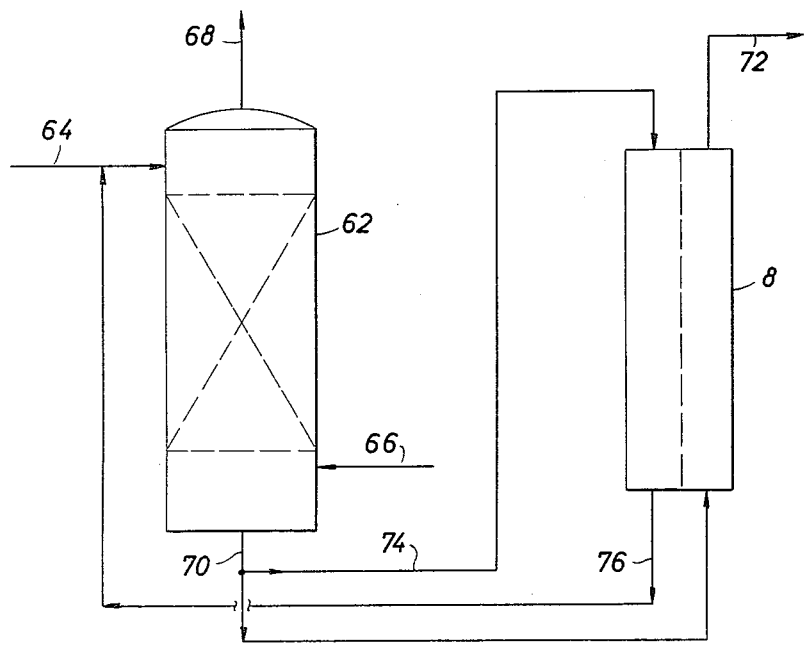
FIG. 3 is a schematic block diagram of an alternative embodiment of a plant in accordance with the invention.

The plant shown in FIG. 3 is suitable for feeds containing higher concentrations of sour components. The sour water to be treated enters a stripping vessel 62 by a line 64. Steam enters at 66 and stripped gases leave by line 68. The partially treated stream leaves the stripping vessel by line 70 to enter the electrodialysis stage 8. Treated water leaves by line 72. The concentrate stream is taken from the partially treated stream in line 70 by line 74 by which it enters the electrodialysis stage 8 through which it flows in countercurrent flow to the dilute stream. The concentrate stream on leaving the electrodialysis stage 8 by line 76 is recombined with the feed to the stripping vessel in line 64.

Figure 4:
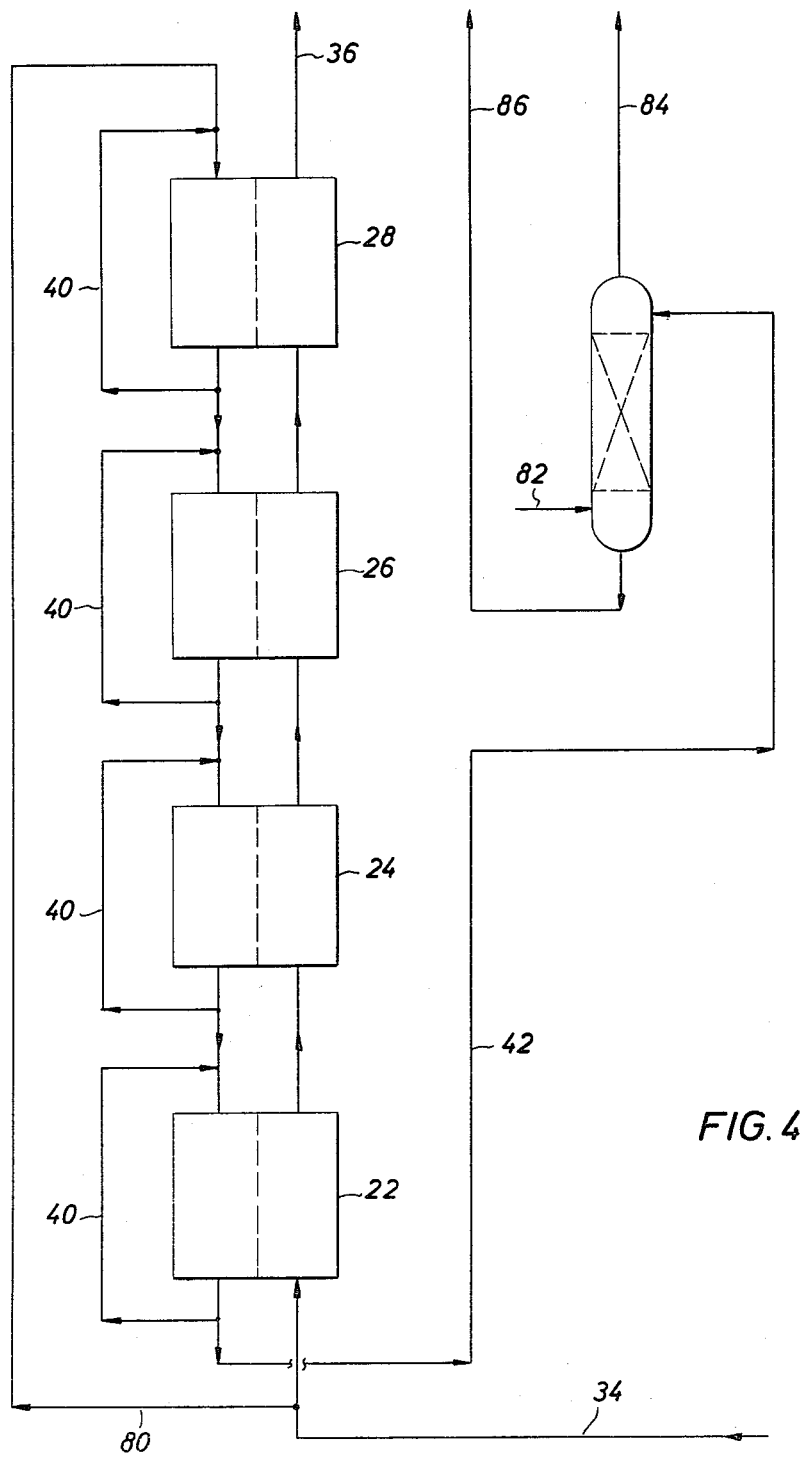
FIG. 4 is a schematic block diagram of a further embodiment of a plant in accordance with the invention.

FIG. 4 shows a plant in which the concentrate stream is concentrated to a very high level in excess of 60,000 ppmw sour components. As in FIG. 2 a sour water stream 34 enters an electrodialysis unit and passes successive stages 22, 24, 26 and 28 arranged in series before leaving the plant as treated sour water by line 36. A part of the feed is passed by line 80 to the last stage 28 of the electrodialysis unit to become the concentrate stream. This stream flows through the electrodialysis stages 28, 26, 24 and 22 in counter current with the dilute stream, and for more effective concentration is recirculated at each stage by means of feed-back loops 40. The concentrate stream leaves electrodialysis stage 22 by line 42 leading to a small steam stripping vessel 80. Steam enters the vessel 80 by line 82 and the released gases leave by the top of the vessel by line 84 for treatment. Water leaves the vessel by line 86 and may be passed to conventional waste water treatment means, such as a biotreater.

In a particular example 100 m$^3$/h sour water at 25° C. containing 6000 ppmw NH$_3$ and H$_2$S in a molar ratio of 1.1 to 1 enters the unit at line 34. Using an effective membrane area of 4800 m with a voltage of between 3 and 4 volts/cell pair at a power consumption of 18 Kwh/m$^3$, 92 m$^3$/h treated water leave by line 36 containing 30 ppmw NH$_3$ and 20 ppmw H$_2$S. The concentrate stream of 8 m$^3$/h leaving the electrodialysis unit by line 42 contains approximately 80,000 ppmw NH$_3$ and H$_2$S in a 1:1 molar ratio. In the stripping vessel 2 m$^3$/h steam is used to reduce the NH$_3$ content of the water leaving by line 86 to 200 ppmw and that of the H$_2$S to 20 ppmw. The non-volatile ionizable components also leave with the water by line 86.

In this example, unlike the one described with reference to FIG. 2, no balancing H$_2$S is added. The dilute stream will tend then to become relatively richer in ammonia which will increase the pH of the stream. This has the effect of ionizing some of the less easily ionizable components, and in particular any phenolates present. Thus, whereas at a pH of 7 practically none of the phenol will be ionized, at a pH of 10 more than 30% will be ionized and thus susceptable to electrodialysis. This is particularly important where a large proportion of the total organic carbon in the sour water is comprised by phenolates, and/or formates, cyanates, carbonates, and the like. Experience has shown that in general 50 to 90% of the phenolates is removed with 95% of H$_2$S in this way.

What is claimed is:

1. A process for treating a sour water stream containing H$_2$S and NH$_3$ to remove a volatile acidic component and a volatile basic component, which comprises subjecting the stream to an electrodialysis step in which the acidic component and the basic component migrate through fixed anion and cation exchange membranes respectively to a concentrate stream or streams leaving a dilute stream or streams reduced in concentration of acidic and basic components, and steam stripping the concentrate stream to remove the volatile acidic component and the volatile basic component.

2. A process as claimed in claim 1 in which at least a part of the concentrate stream after it has been steam stripped is recirculated to the concentrate side in the electrodialysis step.

3. A process as claimed in claim 1 or claim 2 in which the sour water stream is steam stripped prior to the electrodialysis step.

4. A process as claimed in claim 1 or 2 in which the concentrate stream flows in countercurrent with the sour water feed stream.

5. A process as claimed in claim 1 wherein the electrodialysis step is carried out in a plurality of stages.

6. A process as claimed in claim 5, in which a part of the concentrate stream is recirculated via a feed-back loop to one or more of the stages.

7. A process as claimed in claim 5 or 6, in which a balancing stream of either the acidic component or the basic component is added between two stages in order to maintain an approximate equilibrium between the two components.

8. A process as claimed in claim 4, 5 or 6 in which the dilute stream in the last electrodialysis step is allowed to become weakly basic in order to favor the ionization of phenolates, formates, cyanates and carbonates.

* * * * *